United States Patent
Marsh et al.

(10) Patent No.: US 9,551,790 B2
(45) Date of Patent: *Jan. 24, 2017

(54) AIRCRAFT ENHANCED REFERENCE SYSTEM AND METHOD

(71) Applicant: The Boeing Company, Chicago, IL (US)

(72) Inventors: Bobby Joe Marsh, Lake Stevens, WA (US); Michael Anthony Lazar, Arlington, WA (US); Kinson D. Vanscotter, West Richland, WA (US); Barry Theophile Cooke, Black Diamond, WA (US); Leonard S. Bodziony, Seattle, WA (US); Richard M. Coleman, Renton, WA (US); Michael Marcus Vander Wel, Lynwood, WA (US); Andrew S. Olson, Snohomish, WA (US); Douglas V. Dorsey, Hansville, WA (US); Orval Marion Nobles, Dittmer, MO (US)

(73) Assignee: THE BOEING COMPANY, Chicago, IL (US)

( * ) Notice: Subject to any disclaimer, the term of this patent is extended or adjusted under 35 U.S.C. 154(b) by 399 days.

This patent is subject to a terminal disclaimer.

(21) Appl. No.: 14/268,841

(22) Filed: May 2, 2014

(65) Prior Publication Data

US 2015/0316649 A1 Nov. 5, 2015

(51) Int. Cl.
*G01C 3/08* (2006.01)
*G01S 17/88* (2006.01)
(Continued)

(52) U.S. Cl.
CPC ............. *G01S 17/88* (2013.01); *B64F 5/0009* (2013.01); *G01B 11/002* (2013.01);
(Continued)

(58) Field of Classification Search
CPC ... G01B 11/002; G01B 11/272; Y10T 29/4978
(Continued)

(56) References Cited

U.S. PATENT DOCUMENTS 6,317,954 B1 * 11/2001 Cunningham ....... G01B 11/002
29/407.09
7,454,265 B2 11/2008 Marsh
(Continued)

OTHER PUBLICATIONS

Extended European Search Report, dated Oct. 19, 2015, regarding Application No. EP15157131.2, 6 pages.

*Primary Examiner* — Mark Hellner
(74) *Attorney, Agent, or Firm* — Yee & Associates, P.C.

(57) ABSTRACT

A method including placing first and second measurement devices proximate first and second aircraft doors, respectively, and determining a first position of the second measurement device relative to a second position of the first measurement device. The method includes placing first and second pluralities of reflective devices inside the aircraft proximate the first and second doors, respectively. The method includes measuring first and second distances from the first and second measurement devices to the first and second pluralities of reflective devices, respectively, and measuring second distances from the second measurement device to the second plurality of reflective devices. Based on a determined position of the second measurement device and further based on the first distances and second distances, third distances are determined between each of the first and second pluralities of reflective devices. The third distances provide a measurement baseline for points on a fuselage and wings.

20 Claims, 7 Drawing Sheets

(51) Int. Cl.
    *G01S 17/08*     (2006.01)
    *B64F 5/00*     (2006.01)
    *G01S 17/66*     (2006.01)
    *G01B 11/00*     (2006.01)
    *G01S 7/48*     (2006.01)
    *G01S 17/87*     (2006.01)

(52) U.S. Cl.
    CPC ............ *G01S 7/4808* (2013.01); *G01S 17/08* (2013.01); *G01S 17/66* (2013.01); *G01S 17/87* (2013.01)

(58) Field of Classification Search
    USPC ........................................................ 356/4.01
    See application file for complete search history.

(56) References Cited

U.S. PATENT DOCUMENTS

| | | |
|---|---|---|
| 7,672,817 B2 | 3/2010 | Marsh et al. |
| 7,756,321 B2 | 7/2010 | Marsh et al. |
| 7,978,322 B2 | 7/2011 | Marsh et al. |
| 8,379,244 B2 * | 2/2013 | Kim ....................... H04L 12/58 |
| | | 358/1.14 |
| 2008/0271523 A1 | 11/2008 | Marsh et al. |
| 2010/0201972 A1 | 8/2010 | Marsh et al. |
| 2012/0300093 A1 | 11/2012 | Laudrain et al. |
| 2012/0303336 A1 | 11/2012 | Becker et al. |

* cited by examiner

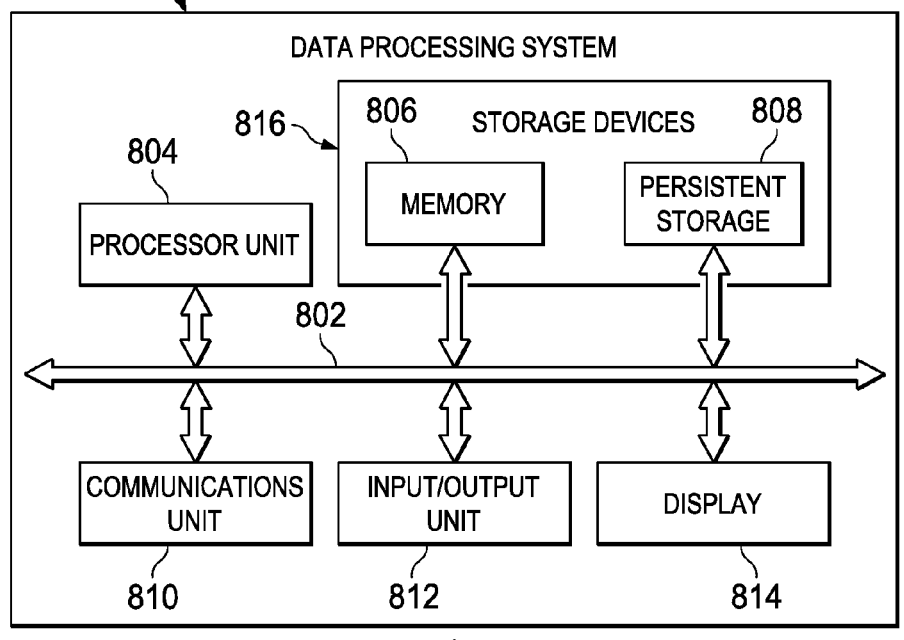
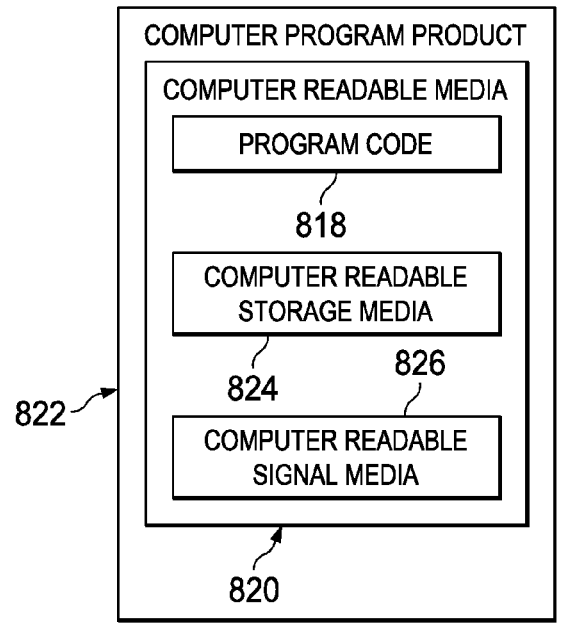
FIG. 8

AIRCRAFT ENHANCED REFERENCE SYSTEM AND METHOD

BACKGROUND INFORMATION

1. Field

The present disclosure relates generally to measurement systems used in manufacturing aircraft and, in particular, to achieving more accurate alignment of aircraft surfaces, proof of aircraft shape, and improved symmetry of left and right wings.

2. Background

Manufacturers of aircraft and other complex products may desire accurate measurements of their finished products. Stable, repeatable, and easily accessed measurement target points on finished aircraft may be difficult to find. Two or more aircraft of the same model and with identical specifications may not be identical in all dimensions when manufacturing is complete. For example, attaching engines and wings to a fuselage potentially changes the shape and size of the fuselage. Shape, size, and wing positioning may also be affected by fuel level at a given time. If the wings are not precisely positioned on the fuselage, the tips of the wings may not be as aligned with each other as desired.

Previously, alignment point drawings have been traditionally relied upon. Special riveted fasteners, occasionally referred to as "golden rivets", provided nominal x, y, and z values for measurements, and these nominal location points were relied upon by refurbishment and ground personnel to work, rework, or replace certain parts of the aircraft.

Previously, gyroscopes or predictive shim processes have been used to measure relationships among parts of an aircraft. Many measurements included only surface to surface contact parts. Many points of measurement and calibration may be covered and thus are no longer accessible once an aircraft enters service. Therefore, it would be desirable to have methods and devices for aircraft metrology that take into account at least some of the issues discussed above, as well as other possible issues.

SUMMARY

The illustrative embodiments provide for a method of referencing points in an aircraft. The method includes placing a first measurement device proximate a first door of the aircraft. The method also includes placing a second measurement device proximate a second door of the aircraft. The method also includes determining a first position of the second measurement device relative to a second position of the first measurement device. The method also includes placing a first plurality of reflective devices inside the aircraft proximate the first door. The first plurality of reflective devices is in a first optical path with the first measurement device. The method also includes placing a second plurality of reflective devices inside the aircraft proximate the second door. The second plurality of reflective devices is in a second optical path with the second measurement device. The method also includes measuring first distances from the first measurement device to the first plurality of reflective devices. The method also includes measuring second distances from the second measurement device to the second plurality of reflective devices. Based on a determined position of the second measurement device and further based on the first distances and second distances, the method also includes determining third distances between each of the first plurality of reflective devices and each of the second plurality of reflective devices. The third distances provide a measurement baseline for a plurality of points on at least one of a fuselage and wings of the aircraft.

The illustrative embodiments also provide for a system of referencing points in an aircraft. The system includes a first measurement device proximate a first door of the aircraft. The system also includes a second measurement device proximate a second door of an aircraft. The system also includes a first plurality of reflective devices placed inside the aircraft proximate the first door. The first plurality of reflective devices is in a first optical path with the first measurement device. The system also includes a second plurality of reflective devices placed inside the aircraft proximate the second door. The second plurality of reflective devices is in a second optical path with the second measurement device. First distances from the first measurement device to the first plurality of reflective devices are measured. Second distances from the second measurement device to the second plurality of reflective devices are measured and based on a determined position of the second measurement device and further based on the first distances and second distances, third distances are determined between each of the first plurality of reflective devices and each of the second plurality of reflective device. The third distances provide a measurement baseline for a plurality of points on at least one of a fuselage and wings of the aircraft. The plurality of points may include points associated with strakelet lights. Strakelet lights are structures that hold landing and taxi lights to wings of aircraft.

The illustrative embodiments also provide for a method of referencing points in an aircraft. The method includes determining a measurement baseline for a first plurality of points in a fuselage of an aircraft, the measurement baseline comprising determined distances between each of the first plurality of points and between the each of the first plurality of points and a first measurement device positioned proximate a first door of the aircraft. The method also includes projecting at least a first light from the first measurement device to at least one reflective device affixed to at least one tip of at least one wing attached to the aircraft to determine at least one distance from the measurement device to the at least one reflective device. The method also includes determining, based on the determined at least one distance and based on the measurement baseline, a fitness of positioning of the at least one wing on the aircraft.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a data processing system, in accordance with an illustrative embodiment.

DETAILED DESCRIPTION

Figure 1:
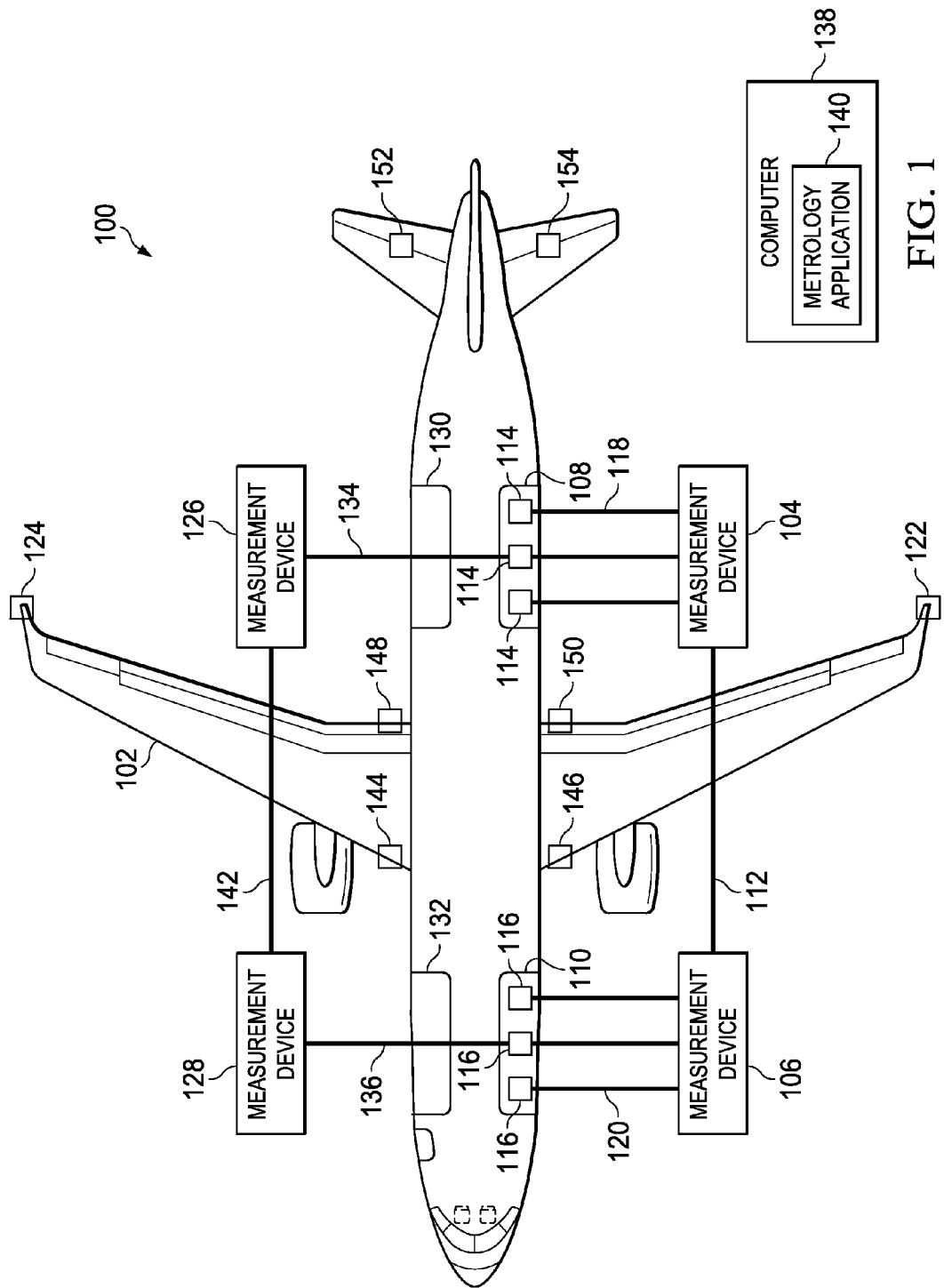
FIG. 1 is an illustration of a block diagram of an aircraft enhanced reference system in accordance with an illustrative embodiment.

The illustrative embodiments recognize and take into account the limitations of previous implementations. Methods for securing precise and repeatable measurements of overall dimensions of commercial jetliners are provided. A base reference system may be created for a particular aircraft that may be stored and relied on for future applications.

The illustrative embodiments provide for at least two measurement devices to be placed near the exterior of an aircraft, each with a clear optical line of sight through open doors into the aircraft. The measurement devices synchronize with each other and generate laser lights or other linear signals to reflective devices situated inside the aircraft near each of the open doors. In an embodiment, the reflective devices are situated on titanium tombstone monuments that may be permanently affixed to the aircraft.

The measurement devices, which may be laser tracking devices, first direct laser lights at each other to establish their relative positions. In an embodiment, each measurement device then directs laser lights to the reflective devices near them inside the aircraft and use these directed laser lights to measure distance to the reflective devices.

Based on a distance between the measurement devices and their relative positioning and distances from each of the measurement devices to their proximate reflective devices, a measurement baseline is established. Metrology applications record the relative positioning and distances and may develop the measurement baseline. Additional reflective devices may be placed at wing tips and on various other points on the wings and fuselage of the aircraft. Further laser lights are directed to the additional reflective devices and distances are calculated and provided to metrology applications to further supplement distance information associated with reflective devices placed inside the aircraft.

The shape of aircraft and wing positioning may change as heavy components are added and as the fuel level changes. Thus, calculations made with data generated by the system provided may be used to determine suitability of the placement of wings and other components in the aircraft. Further observations may be made during manufacturing before and after heavy components, such as engines and landing gear, are installed on the aircraft. Further observations and analysis may take place with various levels of fuel in the aircraft.

The illustrative embodiments provide systems and methods for precise and repeatable measurement of overall dimensions of a vehicle, particularly aircraft, and more particularly commercial jets. However, the illustrative embodiments may be applied to any vehicle using selected measurement points, using techniques similar to those described herein. Measurements may promote comparison of actual completed aircraft dimensions to engineering requirements. Measurement benchmarks established by the illustrative embodiments become built-in features of the completed aircraft and provide a consistent frame of reference to measure critical features.

Various data generated through use of the illustrative embodiments may be used to identify and control manufacturing processes and systematically reduce variations. A desirable outcome may be finished aircraft requiring less compensation for manufacturing variations wherein compensation includes adjustments to flight control surfaces, shims and fillers, and repeated rigging of moveable parts. Aircraft performance may also benefit by enabling aircraft configuration that meets design requirements.

The illustrative embodiments may promote improved fuel efficiency and provide certifiable proof of individual aircraft shape. Calibration and setting of strakelet lights and landing lights may be made easier. Heads up display calibration time may be reduced and symmetry of wings may be improved. The illustrative embodiments may promote improvement of time and quality for incorporating changes to aircraft and maintenance when aircraft are on ground because locations of aircraft components are more accurate.

The illustrative embodiments promote measurement of true wing shape, symmetry, angle of incident, and the dihedral angle, which is the upward angle from horizontal of the wings of a fixed-wing aircraft. True vertical fin, horizontal stabilizer shape, and the relationship of wings may be measured and recorded. Such measurements of large areas may promote detection of aircraft deformation or shape shifting and may promote aircraft measurement transformation repeatability.

Attention is now turned to the figures. FIG. 1 is an illustration of a block diagram of an aircraft enhanced reference system in accordance with an illustrative embodiment. FIG. 1 depicts system 100 including aircraft 102. Aircraft 102 in FIG. 1 is shown as a commercial jet aircraft; however, the illustrative embodiments may apply to any aircraft and to most vehicles generally. Aircraft 102 is described with respect to FIG. 4 described in further detail below. System 100 also includes measurement device 104 and measurement device 106 that may be laser tracking devices. Measurement device 104 and measurement device 106 may direct laser lights at each other to take measurements of distance between each other. With the assistance of metrology calculations, relative positions of measurement device 104 and measurement device 106 relative to each other may be determined.

The illustrative embodiments may be varied. For example, while the illustrative embodiments describe the use of lasers, other optical devices may be used, including light emitting devices (LEDs) or other light sources. In some illustrative embodiments, acoustic measurements of distance could be taken. Thus, the illustrative embodiments are not limited to lasers or optical reflectors. Any reference herein to the use of laser-based distance measurement systems should also be construed as potentially being a different distance measuring system.

In an embodiment, measurement device 104 is stationed proximate door 108 of aircraft 102. In an embodiment, door 108 is a portside aft door of aircraft 102.

In an embodiment, measurement device 106 is stationed proximate door 110 of aircraft 102. In an embodiment, door 110 is a portside forward door of aircraft 102.

As noted, measurement device 104 and measurement device 106 may direct lasers, lights, or beams at each other to take measurements of distance between measurement device 104 and measurement device 106. Such laser lights between measurement device 104 and measurement device 106 are represented in FIG. 1 by laser light 112.

System 100 also includes reflective devices 114 and reflective devices 116. Reflective devices 114 are situated inside aircraft 102 near door 108 with clear optical lines of sight between measurement device 104 and each of reflective devices 114. Reflective devices 116 may be situated inside aircraft 102 near door 110 with clear optical lines of sight between measurement device 106 and reflective devices 116. Reflective devices 114 and reflective devices 116 may be tooling ball reflectors.

The illustrative embodiments recognize and take into account that three of each of reflective devices 114 and reflective devices 116 may provide satisfactory results in yielding measurements of aircraft dimensions. In different embodiments, more than or less than three of each of reflective devices 114 and reflective devices 116 may be deployed.

Each of reflective devices 114 and reflective devices 116 may be situated on a tombstone fitting, such as tombstone fitting 502 shown in FIG. 5, described in more detail below. A tombstone fitting is defined as a bolt or other fastener that is installed into the floor of a vehicle, such as of aircraft 102, and also installed in a recess below or adjacent to the floor. A tombstone fitting may be installed during manufacturing. A tombstone fitting may remain in place through the life of aircraft 102. Tombstone fittings may be located below at least one of galleys, closets, and lavatories proximate door 108 or door 110 and may be used as stanchions upon which galleys, closets, and lavatories may be placed and affixed. Tombstone fittings may be titanium bolts shaped such that reflective devices 114 and reflective devices 116 may be placed securely atop the tombstone fittings while various measurements are being taken prior to installation of galleys, closets, and lavatories or during maintenance when galleys, closets, and lavatories are removed.

System 100 also includes laser lights 118 and laser lights 120. Laser lights 118 may be laser lights directed from measurement device 104 to reflective devices 114. Laser lights 120 may be laser lights directed from measurement device 106 to reflective devices 116.

Based on the directing of laser lights 118 from measurement device 104 to reflective devices 114, first distances may be determined. Based on the directing of laser lights 120 to from measurement device 106 to reflective devices 116, second distances may be determined.

As noted, reflective devices 114 may include three reflective devices, though more or fewer may be present. As illustrated, reflective devices 114 are installed into the floor of aircraft 102 proximate door 108 during manufacturing of aircraft 102. The initial distances between these objects may be known. Similarly, reflective devices 116 may also include about three reflective devices. Further, reflective devices 116 are installed into the floor of aircraft 102 proximate door 110 during manufacturing of aircraft 102 and have a known initial distance. In some contemporary commercial aircraft, door 108 and door 110 may be about 120 feet from each other.

Differences in measurements of components are likely to exist for any two aircraft, even among aircraft of the same model and identical, or nearly identical, specifications. Distances among components in the same aircraft may change over time, depending on fuel status, use, and other factors. For at least such reasons, distances between each of reflective devices 114 located near door 108 in the rear or aft of aircraft 102 and each of reflective devices 116 located near door 110 in the forward section of aircraft 102 may not be known precisely. The illustrative embodiments provide a mechanism to precisely know the distances among components of an aircraft at any convenient time.

Figure 6:
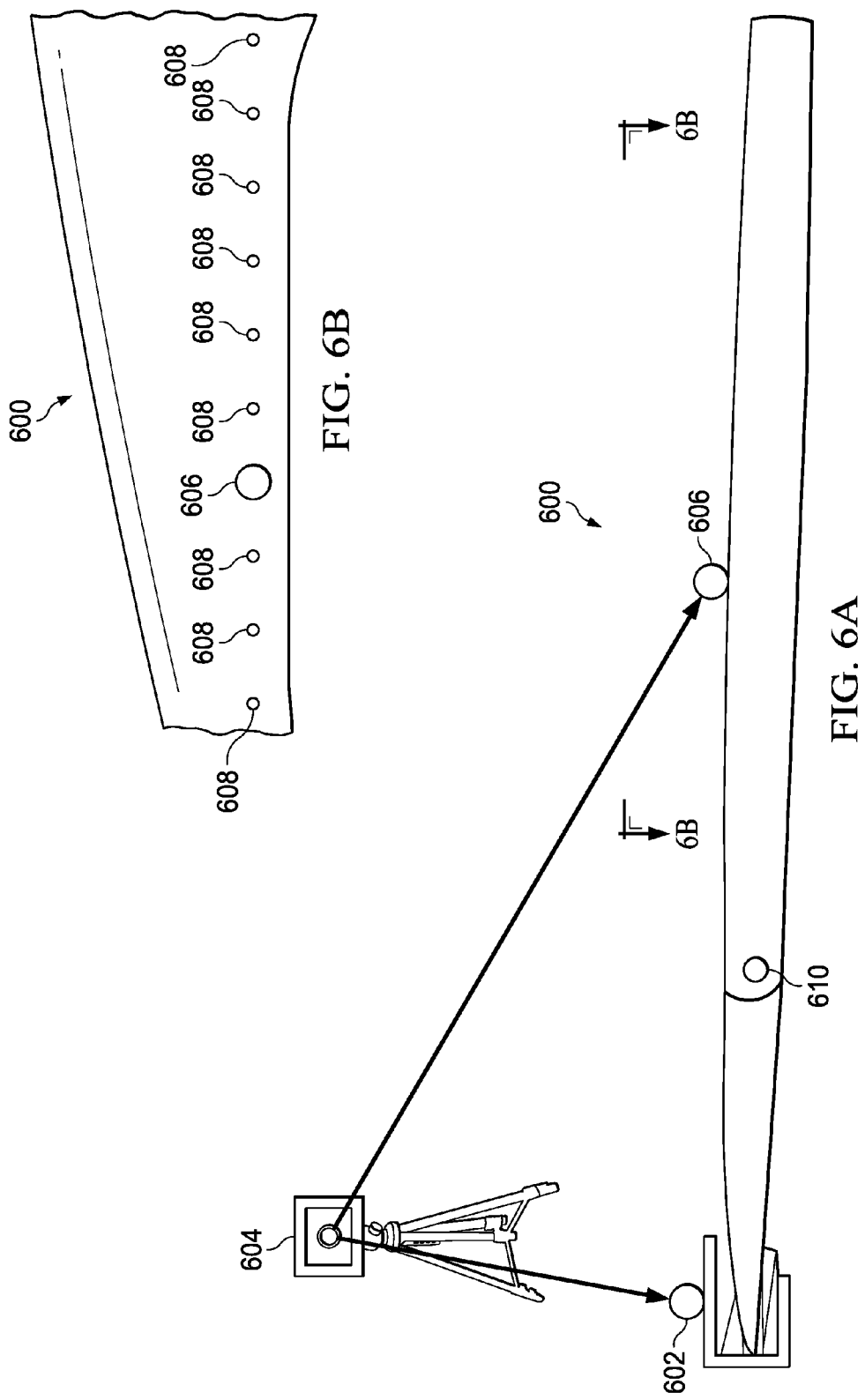
FIG. 6a is an illustration of an aircraft enhanced reference system in accordance with an illustrative embodiment.
FIG. 6b is a diagram of an aircraft enhanced reference system in accordance with an illustrative embodiment.

System 100 may also include computer 138 that may be a general purpose computer. General purpose computers are described with respect to FIG. 6, described in more detail below. System 100 also includes metrology application 140 that executes at least partially on computer 138 and performs calculations generated by the components of system 100.

Measurements of distance between measurement device 104 and measurement device 106 may be taken by at least one projection of laser light 112. Laser light 112 may be used to establish positioning of measurement device 106 relative to measurement device 104. Such positioning may be provided to metrology application 140 and may be used as a baseline for further measurements.

As noted, first distances may be determined based on the directing of laser lights 118 from measurement device 104 to reflective devices 114. Further, second distances may be determined based on the directing of laser lights 120 from measurement device 106 to reflective devices 116. The first distances and the second distances may be provided to metrology application 140. In an embodiment, the first distances and the second distances may be determined several times with results provided to metrology application 140.

Metrology application 140 may be used to process positioning information regarding measurement device 104 and measurement device 106 that describes positions of measurement device 104 and measurement device 106 relative to each other. This positioning information may form the baseline for numerous calculations by metrology application 140. Metrology application 140 then may be used to process positioning information associated with laser light 112 with previously determined first distances and second distances.

Based on this processing, distances between each of reflective devices 114 and reflective devices 116 may be determined. Based on these distances determined by metrology application 140, positioning information between measurement device 104 and measurement device 106, and the first and second distances, system 100 may create a reference system. This reference system may be used in establishing distances between each of reflective devices 114, and reflective devices 116, and other points on aircraft 102. Other points may include wing tips and other locations on the fuselage and wings. Because positioning of tombstone monuments may take place at time of manufacturing and might not change, the reference system based on calculations made by metrology application 140 may be reliable in determining distances between numerous points on aircraft 102 and developing a comprehensive overall view of an exact shape and size of aircraft 102.

System 100 also includes reflective device 122 and reflective device 124 situated on the left or portside wing and on the right or starboard wing, respectively, of aircraft 102. Reflective device 122 and reflective device 124 may be tooling ball reflectors and may be similar or identical to reflective devices 114 and reflective devices 116. Other types of reflectors may be used in other illustrative embodiments. Reflective device 122 and reflective device 124 might not be situated on tombstone monuments and may be fixed on the portside wing and starboard wing, respectively. Once positioning and distance of reflective devices 114 and reflective devices 116 relative to each other and relative to each of measurement device 104 and measurement device 106 is determined by metrology application 140 as described above, distances and positioning of these components relative to reflective device 122 and reflective device 124 situated on the wings may be determined.

System 100 also includes measurement device 126 and measurement device 128 positioned proximate aircraft 102. Measurement device 126 may be positioned proximate starboard aft side of aircraft 102. Measurement device 128 may be positioned proximate the starboard forward side of aircraft 102. Measurement device 126 and measurement device 128 are positioned relative to each other in a manner similar to the relative positioning of measurement device 104 and measurement device 106 on the port side of aircraft 102. Measurement device 126 and measurement device 128 may project laser light 142 at each other in either direction. System 100 hence provides that aircraft 102 has four of measurement devices in a rectangular pattern with clear optical lines of sight as depicted in FIG. 1. Other shape patterns may be used, as more or fewer lasers and measurement devices may be present.

System 100 also includes door 130 of aircraft 102 proximate measurement device 126 at the starboard aft side of aircraft 102. System 100 also includes door 132 of aircraft 102 proximate measurement device 128 at the starboard forward side of aircraft 102.

When each of door 108 and door 130 is open, measurement device 104 may have clear, unobstructed lines of sight to both measurement device 126 and reflective device 124 on the starboard wing as well as to reflective devices 114 as discussed previously. Conversely, when each of door 108 and door 130 is open, measurement device 126 may have clear, unobstructed lines of sight to both measurement device 104 and reflective device 122 on the portside wing. System 100 also includes laser light 134 between measurement device 104 and measurement device 126 that may be projected in either or both directions when door 108 and door 130 are open.

Similar to above, when each of door 110 and door 132 is open, measurement device 106 and measurement device 128 may "see" each other and project laser lights in either direction or to each other in both directions. System 100 further may include laser light 136 that may be projected in either or both directions between measurement device 106 and measurement device 128.

When each of measurement device 104, measurement device 106, measurement device 126, and measurement device 128 projects its respective laser light 112, laser lights 118, laser lights 120, laser light 134, laser light 136, and laser light 142 to measure distances between the components, as described herein, and provides the distance information to metrology application 140 for calculations, the reference system is made more comprehensive. Repeated measurements may be taken for possibly accuracy improved.

In FIG. 1, door 108, door 110, door 130, and door 132 may not be drawn to scale with other components of aircraft 102. In FIG. 1, door 108, door 110, door 130, and door 132 are depicted as larger than scale for illustration purposes.

As noted, measurement device 104 has a clear optical line of sight to reflective device 124 on the tip of the starboard wing first through door 108 and then through door 130. Conversely, measurement device 126 has a clear optical line of sight to reflective device 122 on the tip of the portside wing first through door 130 and then through door 108. Based on these clear optical lines of sight, further laser lights may be projected. Distance between measurement device 104 and reflective device 124 may be calculated. Distance between measurement device 126 and reflective device 122 may be calculated. These two additional distance measurements may be provided to metrology application 140 that integrates these two additional measurements into the reference system. The reference system at this point either has calculated or can calculate distances between any of reflective devices 114, reflective devices 116, reflective device 122, and reflective device 124 as well as any of these components and any or all of measurement device 104, measurement device 106, measurement device 126, and measurement device 128.

Measurements described herein may be taken on a repeated basis and may be provided to metrology application 140 for confirmed repeatability. While placement of measurement device 104, measurement device 106, measurement device 126, and measurement device 128 proximate aircraft 102 may be temporary and done while aircraft is undergoing manufacturing, measurements taken between each of reflective devices 114, reflective devices 116, reflective device 122, and reflective device 124 may be recorded and confirmed at later times after manufacturing.

In an embodiment, additional reflective devices may be placed on other locations of aircraft 102 and distance measurements taken from an appropriate measurement device 104, measurement device 106, measurement device 126, and measurement device 128. For example, reflective devices may be placed at the position of strakelet light 144 and strakelet light 146 near the forward points where each wing attaches to the fuselage of aircraft 102. Also, reflective devices may be placed at trailing edge target 148 and at trailing edge target 150 along the trailing or rear edges of the wings. While trailing edge target 148 and trailing edge target 150 are depicted in FIG. 1 as being proximate the fuselage, trailing edge target 148 and trailing edge target 150 may be further away from the fuselage along the trailing edges of their wings and nearer the tips of the wings.

System 100 also may include reflective device 152 and reflective device 154 affixed to tail section of aircraft 102. Any of measurement device 104, measurement device 106, measurement device 126, and measurement device 128 with an unobstructed optical line of sight may direct laser lights to at least one of reflective device 152 and reflective device 154 and provide distance information to metrology application 140 for processing as described herein.

A minor variance in placement of a wing on a fuselage may cause a wing tip to be a significant distance from its intended position. For example, a wing positioning error of $5/1000$ on the fuselage could result in the wing tip varying by several inches from a point where it should be. System 100 promotes measurement of positioning of wings during manufacturing such that both wings may be placed with significant accuracy on the fuselage and may be symmetrical with each other.

Physical dimensions of aircraft 102 may be repeatedly measured using system 100 during and after manufacturing. Dimensions of aircraft 102 may change at various stages of manufacturing and thereafter as components are added and weight of aircraft changes. For example, installing heavy components such as engines and landing gear on aircraft 102 during manufacturing changes the shape of aircraft 102, even if such changes are not visible to the naked eye. Measurements using the techniques described above may be taken before and after components are attached to aircraft 102 and determinations may be made about fitness of installation based on the measurements.

In addition, the shape of aircraft 102 including positioning of wings may change depending upon fuel level of aircraft 102. The measurements described above may be taken at various fuel levels. Changing shape and wing positioning of aircraft 102 and positioning of wings may be observed with information provided to metrology application 140 for new calculations and comparisons with previous calculations and measurements.

Algorithms and other quantitative tools developed for analyzing aircraft dimensions at various fuel levels may be used in conjunction with determinations made at least by metrology application 140 that performs operations on data generated by systems and methods provided herein. Some algorithms may, for example, process measurement data that describe dimensions of aircraft 102 determined using an x, y, and z spatial coordinate system at various fuel levels. Such coordinate systems may, for example, express horizontal locations of a point as a z coordinate. Reflective device 122 and reflective device 124 at tips of wings and reflective devices 144 and reflective device 146 positioned on at or near strakelet light 144 and strakelet light 146 on wings may have varying x, y, and z coordinate values because of changes in fuel level due to positioning of wings associated with weight of fuel.

Such algorithms may suggest optimal x, y, and z values or wing positions at various fuel levels. Sensitive jacks applied to the wings may be used to simulate various fuel levels during testing to assist in wing shape fuel flexure calculations.

Algorithms using such coordinate systems that perform wing shape fuel flexure calculations may provide information to metrology application 140. Metrology application 140 may use such information along with data generated by systems and methods provided herein to generate enhanced data and support more informed decision making.

Figure 2:
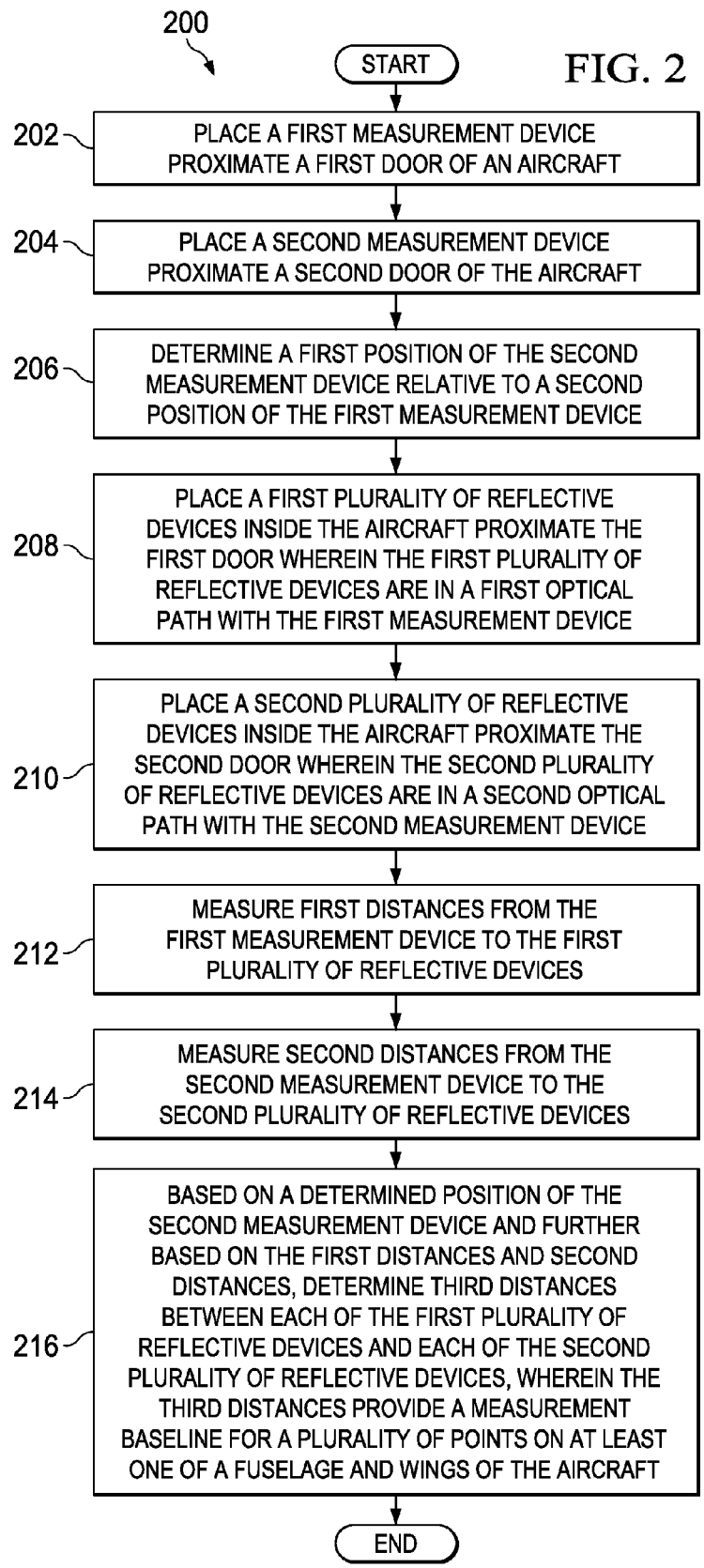
FIG. 2 is a flowchart of a method of referencing points in an aircraft in accordance with an illustrative embodiment

FIG. 2 is a flowchart of a method of referencing points in an aircraft in accordance with an illustrative embodiment. Method 200 shown in FIG. 2 may be used to implement system 100 of FIG. 1. The process shown in FIG. 2 may be a variation of the techniques described in FIG. 1, FIG. 3, FIG. 5, and FIG. 6 described in more detail below.

Method 200 may begin with a first measurement device being placed proximate a first door of an aircraft (operation 202). Placement may be performed by manually attaching the first measurement device or using a robot to attach the first measurement device. Placement may be made via use of a tombstone fitting, as described above.

Next, a second measurement device may be placed proximate a second door of the aircraft (operation 204). Again, placement may be performed by manually attaching the first measurement device or using a robot to attach the first measurement device. Placement may be made via use of a tombstone fitting, as described above. Next, a processor, other device, metrology application, or other software may determine a first position of the second measurement device relative to a second position of the first measurement device (operation 206).

Concurrently, or perhaps even before determining the first position, a first plurality of reflective devices may be placed inside the aircraft proximate the first door wherein the first plurality of reflective devices are in a first optical path with the first measurement device (operation 208). Likewise concurrently, or perhaps before determining the first position, a second plurality of reflective devices may be placed inside the aircraft proximate the second door, wherein the second plurality of reflective devices are in a second optical path with the second measurement device (operation 210). Again, for both operations 208 and 210, placement may be performed by manually attaching the first measurement device or using a robot to attach the first measurement device. Placement may be made via use of a tombstone fitting, as described above.

A processor, other device, metrology application, or other software may measure first distances from the first measurement device to the first plurality of reflective devices (operation 212). This measurement may in some cases take place concurrently with or prior to the determining of the first position in operation 206, especially if operations 208 and 210 are performed before operations 202 and 204.

A processor, other device, metrology application, or other software may measure second distances from the second measurement device to the second plurality of reflective devices (operation 214). This operation (operation 214) may be performed concurrently with operation 212, or in some cases may be performed before operation 212.

Finally, based on a determined position of the second measurement device and further based on the first distances and second distances, the processor, other device, metrology application, or other software may determine third distances between each of the first plurality of reflective devices and each of the second plurality of reflective devices, wherein the third distances provide a measurement baseline for a plurality of points on at least one of a fuselage and wings of the aircraft (operation 216). Method 200 may terminate thereafter.

The second position of the second measurement device relative to the first position of the first measurement device may be determined by measurements of lights projected between the second measurement device and the first measurement device. The measurements may be processed by metrology software. The first distances and the second distances may be measured using lights projected from the first measurement device to the first plurality of reflective devices and lights projected from the second measurement device to the second plurality reflective devices. The first door may be portside aft of the aircraft and the second door may be portside forward of the aircraft, though this arrangement may be reversed. The reflective devices may be tooling ball reflectors, or may be other types of reflectors. The reflective devices may be attached to tombstone fittings affixed to a deck surface of a primary passenger area of the aircraft. In an embodiment, the first plurality of reflective devices and the second plurality of reflective devices each comprise steel spheres, wherein the laser lights comprise a laser radar system. However, other materials may be used for the reflective devices and other light-based metrology systems may be used.

In a specific illustrative embodiment, the second measurement device may be measurement device 106 and the first measurement device may be measurement device 104 of system 100. In method 200, the second reflective devices may be reflective devices 116 and the first reflective devices may be reflective devices 114 of system 100. In method 200, the metrology software may be metrology application 140 of system 100. In method 200, the first open door may be door 108 and the second open door may be door 110 of system 100. In method 200, the lights projected from the first measurement device may be laser lights 118 and the lights projected from the second measurement device may be laser lights 120 of system 100. In method 200, the tombstone fittings may be tombstone fitting 502, tombstone fitting 504, and tombstone fitting 506 depicted in FIG. 5 described in more detail below.

Figure 3:
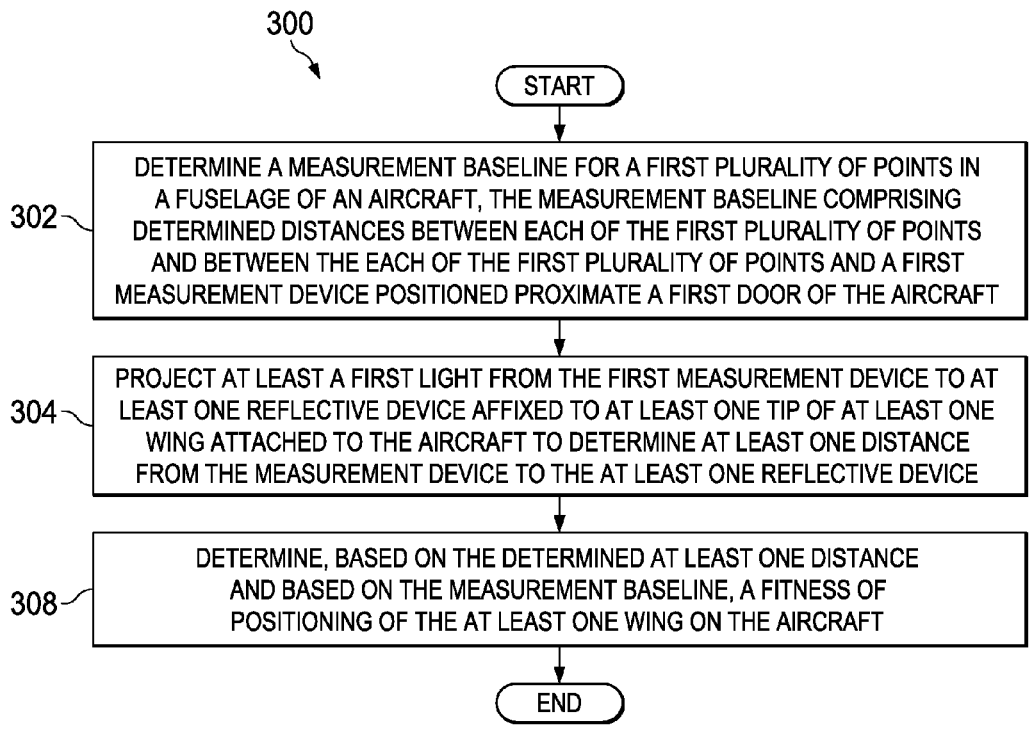
FIG. 3 is a flowchart of a method of referencing points in an aircraft in accordance with an illustrative embodiment.

FIG. 3 is a flowchart of a method of referencing points in an aircraft, in accordance with an illustrative embodiment. Method 300 shown in FIG. 3 may be implemented using system 100 of FIG. 1. The process shown in FIG. 3 may be implemented by a processor, such as processor unit 804 of FIG. 8 described in more detail below. The process shown in FIG. 3 may be a variation of the techniques described in FIG. 1, FIG. 2, and FIG. 5 and FIG. 6 described in more detail below.

Method 300 may begin as a processor, other device, metrology application, or other software may determine a measurement baseline for a first plurality of points in a fuselage of an aircraft, the measurement baseline comprising determined distances between each of the first plurality of points and between the each of the first plurality of points and a first measurement device positioned proximate a first door of the aircraft (operation 302). Next, a laser, light emitting diode, or other light source may project at least a first light from the first measurement device to at least one reflective device affixed to at least one tip of at least one wing attached to the aircraft to determine at least one distance from the measurement device to the at least one reflective device (operation 304).

Next, the processor, other device, metrology application, or other software may determine, based on the determined at least one distance and based on the measurement baseline, a fitness of positioning of the at least one wing on the aircraft (operation 306). Method 300 may terminate thereafter.

Method 300 may be varied. For example, distances between each of the first plurality of points and between the each of the first plurality of points and the first measurement device may be determined by projecting second lights from the first measurement device to second reflective devices positioned at each of the first plurality of points. Metrology software may be used in processing the determined distances to determine the measurement baseline and to determine the fitness of positioning of the at least one wing.

In another illustrative embodiment, third lights may be projected to third reflective devices affixed to a tail section of the aircraft to determine a fitness of positioning of the tail section on the aircraft. Fourth lights may be projected from a plurality of measurement devices proximate the aircraft to the at least one reflective device attached to the at least one tip of the at least one wing and to the third reflective devices affixed to a tail section of the aircraft. Measurements associated with the projected fourth lights may be processed by metrology software to support further determinations regarding the fitness of positioning of the at least one wing and the tail section.

In still another illustrative embodiment, the first plurality of points may be locations of reflective devices 114 and reflective devices 116 of system 100. The first measurement device may be measurement device 106 of system 100. The second lights may be laser lights 120 of system 100. The second reflective devices may be reflective devices 116 of system 100. The metrology software may be metrology application 140 of system 100. The third lights do not have an equivalent component depicted in FIG. 1 but may be laser lights projected from any measurement device to either of reflective device 152 and reflective device 154 of system 100 where a clear optical line of sight is available. Likewise, the fourth lights do not have an equivalent component depicted in FIG. 1, but may be laser lights projected from any measurement device to either of reflective device 122 or reflective device 124 of system 100 where a clear optical line of sight is available.

In an embodiment, measurement devices may not be tooling ball reflectors and may instead be small steel spheres placed in tombstone monuments, or may be other optical reflectors. In an illustrative embodiment, the measurement device may project radio frequency photons at the steel spheres instead of laser lights, in which case RADAR may be used to determine distances. Calculations and determinations made by metrology application 140 may be used by product lifecycle management (PLM) software to improve lifecycle management of the manufacturing and maintenance of the aircraft.

Figure 4:
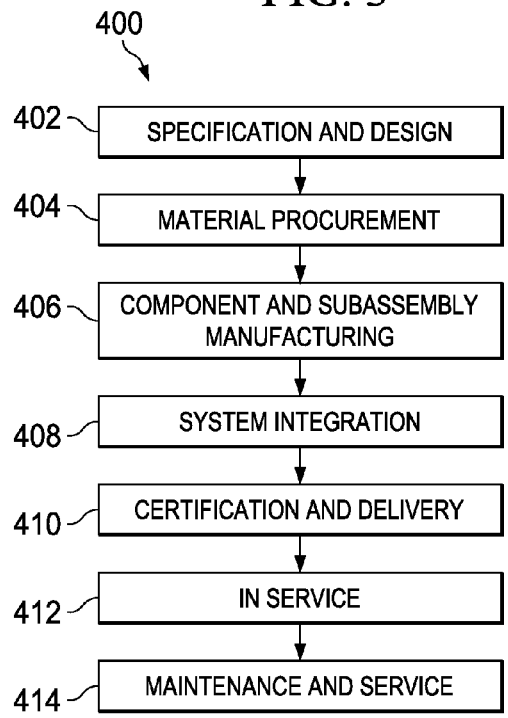
FIG. 4 is a flowchart of a method of manufacturing a commercial aircraft.
Figure 7:
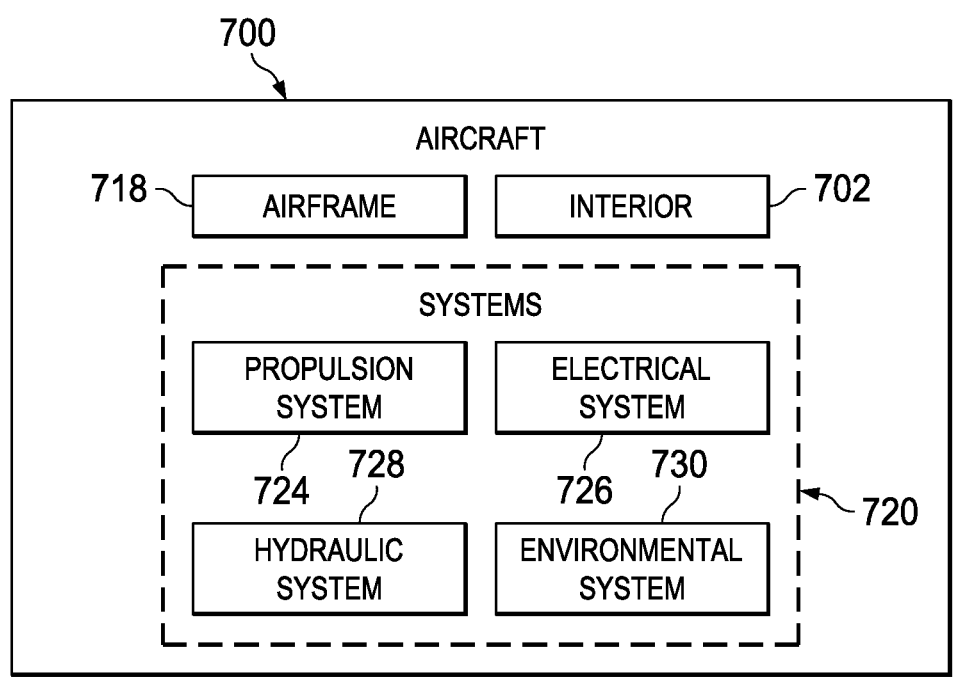
FIG. 7 is a block diagram of a commercial aircraft.

FIG. 4 is a flowchart of a method of manufacturing a commercial aircraft, for example, aircraft 102 of FIG. 1. Referring to FIG. 4 and FIG. 7, the illustrative embodiments may be described in the context of an aircraft manufacturing and service method 400 as shown in FIG. 4 and aircraft 700 as shown in FIG. 7 described in more detail below. For example, while not depicted in FIG. 4 or explicitly provided as a step of aircraft manufacturing and service method 400, verification of desired installation of wings on aircraft 700 may involve the metrological systems and methods described herein.

During pre-production, aircraft manufacturing and service method 400 may include specification and design 402 of aircraft 700 and material procurement 404. During production, component and subassembly manufacturing 406 and system integration 408 of the aircraft 700 takes place. Thereafter, aircraft 700 may go through certification and delivery 410 in order to be placed in service 412. During any of operations 406, 408, or 410, metrology devices described with respect to FIG. 1 and metrology methods described with respect to FIG. 2 and FIG. 3 may be used to verify manufacturing or integration of the aircraft of components of the aircraft, or may be used as part of the certification of the aircraft.

While in service by a customer, aircraft 700 may be scheduled for maintenance and service 414. Maintenance and service may include modification, reconfiguration, refurbishment, and other actions taken with respect to the aircraft. During such maintenance metrology devices described with respect to FIG. 1 and metrology methods described with respect to FIG. 2 and FIG. 3 may be used as part of performing maintenance or for verification that maintenance was performed in a desired manner.

Each of the processes of aircraft manufacturing and service method 400 may be performed or carried out by a system integrator, a third party, and/or an operator (e.g., a customer). For the purposes of this description, a system integrator may include without limitation, any number of aircraft manufacturers and major-system subcontractors; a third party may include without limitation, any number of venders, subcontractors, and suppliers; and an operator may be an airline, leasing company, military entity, service organization, and so on.

Figure 5:
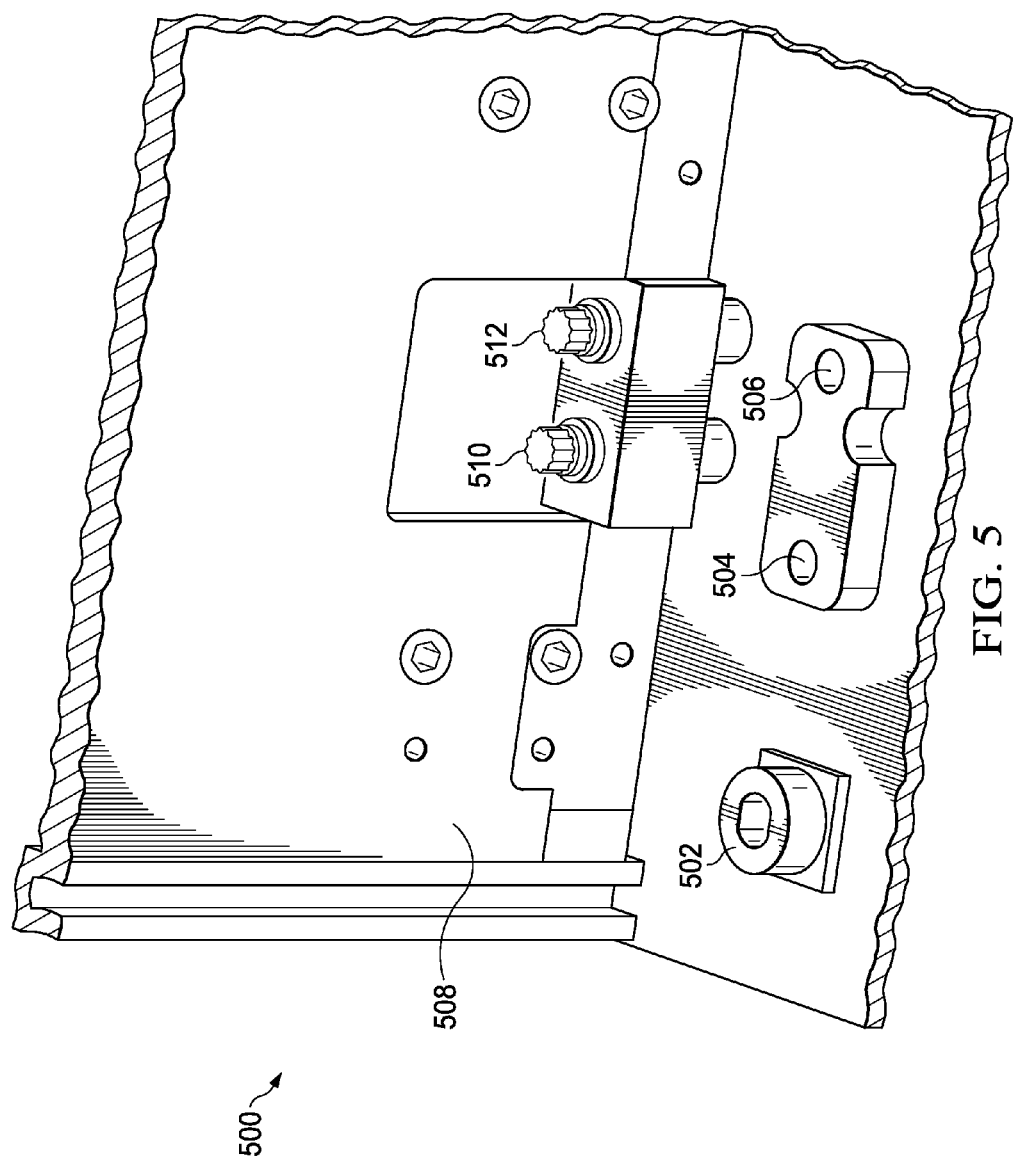
FIG. 5 is an illustration of part of an aircraft enhanced reference system in accordance with an illustrative embodiment.

FIG. 5 is a diagram of part of an aircraft enhanced reference system in accordance with an illustrative embodiment. FIG. 5 depicts system 500 including tombstone fitting 502, tombstone fitting 504, and tombstone fitting 506 affixed to floor of aircraft 102 of system 100. In an embodiment, reflective devices 114 and reflective devices 116 could be placed atop tombstone fitting 502, tombstone fitting 504, and tombstone fitting 506 for use with components of system 100, as previously described.

In an embodiment, system 500 may be in either a forward area or aft area of aircraft 102. FIG. 5 also depicts galley 508 that is not installed in FIG. 5 but may be lowered onto tombstone fitting 502, tombstone fitting 504, and tombstone fitting 506 and affixed thereon using at least one of bolt 510 and bolt 512. Galley 508 may alternatively be a lavatory, a closet, or some other internal feature of the aircraft.

FIG. 6a is a diagram of an aircraft enhanced reference system in accordance with an illustrative embodiment. FIG. 6b is a diagram of an aircraft enhanced reference system in accordance with an illustrative embodiment. Together, FIG. 6a and FIG. 6b depict system 600. FIG. 6a provides an end view of wing of aircraft 102 of system 100 viewed from the starboard side of aircraft 102. FIG. 6b provides an overhead view of the same wing. System 600 includes reflective device 602 which corresponds to reflective device 124 of system 100. System 600 also includes measurement device 604 which may correspond to one of measurement device 104, measurement device 126, and measurement device 128.

System 600 also includes reflective device 606 which is situated in the midsection of the surface of the wing. While reflective device 606 may not correspond to any of the reflective devices provided in system 100, in an embodiment, system 100 includes at least one reflective device situated in the midsection of the wing in a manner similar to system 600 as shown.

Reflective device 606 is depicted in two views as illustrated in FIG. 6a and FIG. 6b. In FIG. 6b, an overhead view is provided looking down upon the top surface of wing, reflective device 606 is depicted as being situated in a line of rivets 608 or other objects attached to the top surface of wing. In FIG. 6a, wherein a side view looking at the end of the wing is provided as opposed to the overhead view of the wing provided by FIG. 6b, reflective device 606 is depicted as situated on a top surface of the wing with reflective device 602 at the trailing edge of the wing. FIG. 6a and FIG. 6b effectively provide views which are 90 degrees rotated from one another.

Measurement device 604 may project a laser light, or some other form of light, such as described with respect to system 100 of FIG. 1, method 200 of FIG. 2, and method 300 of FIG. 3, to both reflective device 602 and reflective device 606, either separately or simultaneously. Distances between measurement device 604 and reflective device 602 and reflective device 606 may be calculated and provided to a metrology application, such as metrology application 140 of FIG. 1, for distance calculations. Such calculations may be combined with other calculations and used in making determinations about the dimensions and shape of aircraft 102 and placement of wings and other components of the aircraft, as described above.

System 600 also may include hinge 610 which connects a main portion of the wing with a flap or aileron of the wing. In an embodiment, reflective device 606 may be used in a manner similar to that described herein with strakelet light 144 of system 100 in conjunction with measurement device 604.

FIG. 7 is a block diagram of a commercial aircraft. As shown in FIG. 7, aircraft 700 produced by aircraft manufacturing and service method 400 may include airframe 718 with a plurality of systems 720 and interior 702. Examples of high-level systems 720 include one or more of propulsion system 724, electrical system 726, hydraulic system 728, and environmental system 730. Any number of other systems may be included. Although an aerospace example is shown, the principles of the invention may be applied to other industries, such as the automotive industry.

The devices and methods described herein may be employed during any one or more of the stages of the production and service method 400 for aircraft 700. For example, components or subassemblies corresponding to production process may be fabricated or manufactured in a manner similar to components or subassemblies produced while aircraft 700 is in service 412. Also, one or more apparatus embodiments, method embodiments, or a combination thereof may be utilized during component and subassembly manufacturing 406 and system integration 408, for example, by substantially expediting assembly of, or reducing the cost of, aircraft 700. Similarly, one or more of the apparatus embodiments, method embodiments, or a combination thereof may be utilized while aircraft 700 is in service 412, for example and without limitation, to maintenance and service 414.

FIG. 8 is an illustration of a data processing system, in accordance with an illustrative embodiment. Data processing system 800 may execute some of the operations of method 200 of FIG. 2 and method 300 of FIG. 3. Data processing system 800 in FIG. 8 may be an example of computer 138, upon which metrology application 140 and other applications may execute. Computer 138 and metrology application 140 may be part of as system 100 of FIG. 1. Storage device, such as memory 806, persistent storage 808, or computer readable media 822 may store a metrology application, such as metrology application 140 of FIG. 1. Any of memory 806, persistent storage 808, or computer readable media 822 may be a non-transitory computer readable storage medium. In turn, computer program product 822 and program code 818 could be metrology application 140 of FIG. 1.

Data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. Software loaded into memory may include metrology application 140 of FIG. 1 that may be executed on processor unit 804 to implement, for example, operation 216 of method 200 of FIG. 2. Processor unit 804 may, for example, execute instructions for metrology application 140 for determining third distances between each of the first plurality of reflective devices and each of the second plurality of reflective devices, as described in method 200 of FIG. 2.

Processor unit 804 may be a number of processors, a multi-processor core, or some other type of processor, depending on the particular implementation. "A number," as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Program code stored in storage devices 816 may include metrology application 140 of FIG. 1 and other software used in executing operations of the methods described above, such as method 200 of FIG. 2 and method 300 of FIG. 3. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Persistent storage 808 may be used to store data generated by the components provided herein. Many measurements may be taken over an extended period of time, for example the entire life of aircraft 102. Such measurements and output of processing such measurements may be stored by persistent storage 808 and used in complying with government and agency regulations, for meeting insurer requirements, to perform maintenance, and for support when an airline or leasing company owning aircraft 102 may wish to sell aircraft 102 and make representations in legal documents regarding airworthiness or other aspects of aircraft 102.

Communications unit 810, in these examples, provides for communications with other data processing systems or devices. In these examples, communications unit 810 is a network interface card. Communications unit 810 may provide communications through the use of either or both physical and wireless communications links. Communications unit 810 may send or receive data, instructions, and other electronic media from measurement device 104, measurement device 106, measurement device 126, and measurement device 128 of FIG. 1.

Input/output (I/O) unit 812 allows for input and output of data with other devices that may be connected to data processing system 800. For example, input/output (I/O) unit 812 may provide a connection for user input through a keyboard, a mouse, and/or some other suitable input device. Further, input/output (I/O) unit 812 may send output to a printer. Display 814 provides a mechanism to display information to a user. Display 814 may display results of measurements, or conclusions based on those measurements, to a user.

Instructions for the operating system, applications, and/or programs may be located in storage devices 816, for example metrology application 140 of FIG. 1, which are in communication with processor unit 804 through communications fabric 802. Instructions may include those instructions associated with executing at least some steps method 200 of FIG. 2 and method 300 of FIG. 3. In these illustrative examples, the instructions may be in a functional form on persistent storage 808. These instructions may be loaded into memory 806 for execution by processor unit 804. The processes of the different embodiments may be performed by processor unit 804 using computer implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 may for example, execute operation 306 of method 300 wherein a fitness of positioning of the at least one wing on aircraft 102 is determined. Program code 818 may execute numerous iterations based on various observations gathered and reported by measurement device 104, measurement device 106, measurement device 126, and measurement device 128 of FIG. 1.

Program code 818 may process observations taken during manufacturing during installation of large systems such as landing gear and engines with various levels of fuel in aircraft 102 of FIG. 1. As shape of aircraft 102 of FIG. 1 and wing positioning may change as heavy components are added and as the fuel level changes, computations made by program code, for example metrology application 140 of FIG. 1, may support decision processes regarding installation of such large systems. More informed comparisons of actual completed aircraft dimensions to engineering requirements may also be enabled. Program code 818 may also promote detection of aircraft deformation or shape shifting during or after manufacturing and in association with installation of landing gear, engines, or other large systems.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826. Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples. Measurement device 104, measurement device 106, measurement device 126, and measurement device 128 of FIG. 1 may wirelessly transmit their gathered data at least regarding dimensions of aircraft 102 to data processing system 800, for example computer 138, as computer 138 may be located remotely from aircraft 102.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. Program code 818 may be software downloaded from a manufacturer of aircraft 102 of FIG. 1 that includes updates to maintenance manuals issued by the manufacturer. Program code 818 may also be software downloaded from a government agency or other regulatory body that describes new or updated regulations regarding, for example, maintenance practices for aircraft 102. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use, for example executing at least some of the steps of at least method 200 of FIG. 2 and method 300 of FIG. 3. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 818 may be omitted because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors. Some steps of at least method 200 of FIG. 2 and method 300 of FIG. 3 may be implemented in the number of hardware units while other steps may be implemented in the number of processors. For example, in operation 306 of method 300, fitness of positioning for one wing of an aircraft may be determined by portions of metrology application 140 of FIG. 1 executing in the number of processors while fitness of positioning of a second wing of the aircraft may be determined by portions of metrology application 140 executed by the number of processors.

As another example, a storage device in data processing system 800 is any hardware apparatus that may store data. Memory 806, persistent storage 808, and computer readable media 820 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 806, or a cache, such as found in an interface and memory controller hub that may be present in communications fabric 802.

Data processing system 800 may also include at least one associative memory (not shown). Associative memory may be in communication with communications fabric 802. Associative memory may also be in communication with, or in some illustrative embodiments, be considered part of storage devices 816.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code, for example metrology application 140 of FIG. 1, such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of referencing points in an aircraft, comprising:
    placing a first measurement device proximate a first door of the aircraft;
    placing a second measurement device proximate a second door of the aircraft;
    determining a first position of the second measurement device relative to a second position of the first measurement device;
    placing a first plurality of reflective devices inside the aircraft proximate the first door wherein the first plurality of reflective devices are in a first optical path with the first measurement device;
    placing a second plurality of reflective devices inside the aircraft proximate the second door wherein the second plurality of reflective devices are in a second optical path with the second measurement device;
    measuring first distances from the first measurement device to the first plurality of reflective devices;
    measuring second distances from the second measurement device to the second plurality of reflective devices; and
    based on a determined position of the second measurement device and further based on the first distances and second distances, determining third distances between each of the first plurality of reflective devices and each of the second plurality of reflective devices, wherein the third distances provide a measurement baseline for a plurality of points on at least one of a fuselage and wings of the aircraft.

2. The method of claim 1, wherein the second position of the second measurement device relative to the first position of the first measurement device is determined by measurements of lights projected between the second measurement device and the first measurement device.

3. The method of claim 2, wherein the measurements are processed by metrology software.

4. The method of claim 1, wherein the first distances and the second distances are measured using lights projected from the first measurement device to the first plurality of reflective devices and lights projected from the second measurement device to the second plurality reflective devices.

5. The method of claim 1, wherein the first door is aft portside of the aircraft and the second door is forward portside of the aircraft.

6. The method of claim 1, wherein the first plurality of reflective devices and the second plurality of reflective devices are tooling ball reflectors.

7. The method of claim 1, wherein the reflective devices are attached to tombstone fittings affixed to a deck surface of a primary passenger area of the aircraft.

8. The method of claim 1, wherein alternate technologies for measuring and determining distances comprise laser radar systems combined with steel spheres as reflective devices, comprise digital photogrammetric systems, and comprise laser scanning systems.

9. A system of referencing points in an aircraft, comprising:
    a first measurement device proximate a first door of the aircraft;
    a second measurement device proximate a second door of the aircraft;
    a first plurality of reflective devices placed inside the aircraft proximate the first door wherein the first plurality of reflective devices are in a first optical path with the first measurement device; and
    a second plurality of reflective devices placed inside the aircraft proximate the second door wherein the second plurality of reflective devices are in a second optical path with the second measurement device,
    wherein first distances from the first measurement device to the first plurality of reflective devices are measured and wherein second distances from the second measurement device to the second plurality of reflective devices are measured, and
    wherein based on a determined position of the second measurement device and further based on the first distances and second distances, third distances are determined between each of the first plurality of reflective devices and each of the second plurality of reflective devices, wherein the third distances provide a measurement baseline for a plurality of points on at least one of a fuselage and wings of the aircraft.

10. The system of claim 9, wherein the determined position of the second measurement device relative to a position of the first measurement device is determined by measurements of lights projected between the second measurement device and the first measurement device.

11. The system of claim 10, wherein the measurements are processed by metrology software.

12. The system of claim 9, wherein the first distances and the second distances are measured using lights projected from the first measurement device to the first plurality of reflective devices and lights projected from the second measurement device to the second plurality reflective devices.

13. The system of claim 9, wherein the first door is aft portside of the aircraft and the second door is forward portside of the aircraft.

14. The system of claim 9, wherein the first plurality of reflective devices and the second plurality of reflective devices are tooling ball reflectors and are attached to tombstone fittings affixed to a deck surface of a primary passenger area of the aircraft.

15. A method of referencing points in an aircraft, comprising:
    determining a measurement baseline for a first plurality of points in a fuselage of the aircraft, the measurement baseline comprising determined distances between each of the first plurality of points and between the each of the first plurality of points and a first measurement device positioned proximate a first door of the aircraft;

projecting at least a first light from the first measurement device to at least one reflective device affixed to at least one tip of at least one wing attached to the aircraft to determine at least one distance from the measurement device to the at least one reflective device; and determining, based on the determined at least one distance and based on the measurement baseline, a fitness of positioning of the at least one wing on the aircraft.

16. The method of claim 15, wherein the distances between each of the first plurality of points and between the each of the first plurality of points and the first measurement device are determined by projecting second lights from the first measurement device to second reflective devices positioned at each of the first plurality of points.

17. The method of claim 15, wherein metrology software is used in processing the determined distances to determine the measurement baseline and to determine the fitness of positioning of the at least one wing.

18. The method of claim 15, further comprising projecting third lights to third reflective devices affixed to a tail section of the aircraft to determine a fitness of positioning of the tail section on the aircraft.

19. The method of claim 15, further comprising projecting fourth lights from a plurality of measurement devices proximate the aircraft to the least one reflective device attached to the at least one tip of at the least one wing and to reflective devices affixed to a tail section of the aircraft.

20. The method of claim 19, wherein measurements associated with the projected fourth lights are processed by metrology software to support further determinations regarding the fitness of positioning of the at least one wing and the tail section.

\* \* \* \* \*